US012485635B2

(12) United States Patent
Martin et al.

(10) Patent No.: US 12,485,635 B2
(45) Date of Patent: Dec. 2, 2025

(54) TIRE SEALANT CELL

(71) Applicant: BRIDGESTONE AMERICAS TIRE OPERATIONS, LLC, Nashville, TN (US)

(72) Inventors: Justin R. Martin, Aiken, SC (US); Randal T. McJunkin, Jr., Irmo, SC (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 103 days.

(21) Appl. No.: 18/688,759

(22) PCT Filed: Jul. 24, 2022

(86) PCT No.: PCT/US2022/074091
§ 371 (c)(1),
(2) Date: Mar. 2, 2024

(87) PCT Pub. No.: WO2023/044186
PCT Pub. Date: Mar. 23, 2023

(65) Prior Publication Data
US 2024/0383216 A1    Nov. 21, 2024

Related U.S. Application Data

(60) Provisional application No. 63/245,222, filed on Sep. 17, 2021.

(51) Int. Cl.
*B29D 30/06* (2006.01)
*B25J 11/00* (2006.01)

(52) U.S. Cl.
CPC ....... *B29D 30/0685* (2013.01); *B25J 11/0075* (2013.01); *B29D 2030/0697* (2013.01)

(58) Field of Classification Search
CPC .... B29D 2030/0022; B29D 2030/0027; B29D 2030/0033; B29D 2030/0038;
(Continued)

(56) References Cited

U.S. PATENT DOCUMENTS

| 4,115,172 A | 9/1978 | Baboff et al. |
| 4,206,008 A * | 6/1980 | Tacke ........................ B05B 7/32 |
| | | 81/15.3 |

(Continued)

FOREIGN PATENT DOCUMENTS

| CN | 111319286 A | 6/2020 |
| JP | 2001018609 A | 1/2001 |

(Continued)

OTHER PUBLICATIONS

European Search Report for corresponding patent application No. 22870873.1, dated Jul. 2, 2025, 6 pages (not prior art).
(Continued)

*Primary Examiner* — Michael P Wieczorek
(74) *Attorney, Agent, or Firm* — Shaun J. Fox; Wayne Beavers

(57) ABSTRACT

Methods are provided for applying a sealant layer to an inner surface of a tire. A first tire may be picked up with a tire handling robot and placed on a first sealant application stand. A sealant bead may be applied to the inner surface of the first tire by a dispense robot. A second tire may be picked up by the tire handling robot and placed on a second sealant
(Continued)

application stand. A sealant bead may be applied to the inner surface of the second tire by the dispense robot. The first and second sealant application stands may be arranged adjacent to each other. The tire handling robot and the dispense robot may be located on opposite sides of the sealant application stands.

12 Claims, 12 Drawing Sheets

(58) Field of Classification Search
CPC .... B29D 2030/0044; B29D 2030/0686; B29D 30/0685; B29D 30/0016
See application file for complete search history.

(56) References Cited

U.S. PATENT DOCUMENTS

| | | | |
|---|---|---|---|
| 4,398,583 | A | 8/1983 | Casey |
| 2008/0264542 | A1 | 10/2008 | Hawkins et al. |
| 2014/0283740 | A1 | 9/2014 | Son |
| 2015/0107743 | A1 | 4/2015 | Seong |
| 2016/0377556 | A1 | 12/2016 | Boffa et al. |
| 2017/0297281 | A1 | 10/2017 | Yukawa et al. |
| 2019/0061295 | A1* | 2/2019 | Ooshima ............... B29C 73/166 |
| 2020/0001560 | A1 | 1/2020 | Matsunami |
| 2020/0189215 | A1 | 6/2020 | Griffoin et al. |
| 2021/0245556 | A1 | 8/2021 | Griffoin et al. |
| 2022/0016858 | A1 | 1/2022 | Pontone |

FOREIGN PATENT DOCUMENTS

| | | |
|---|---|---|
| JP | 2014217953 A | 11/2014 |
| JP | 2018020508 A | 2/2018 |
| WO | 2016105410 A1 | 6/2016 |
| WO | 2019123201 A1 | 6/2019 |
| WO | 2019123272 A1 | 6/2019 |
| WO | 2019123275 A1 | 6/2019 |
| WO | 2020152593 A1 | 7/2020 |

OTHER PUBLICATIONS

"Defect Classification on Automobile Tire Inner Surfaces using Convolutional Neural Networks", Abstract of IEEE Conference Proceedings (Aug. 17, 2017)( 3 pages).
International Search Report for the corresponding patent application No. PCT/US2022/074091, dated Nov. 23, 2022, 9 pages (not prior art).
Japan Search Report for corresponding JP 2024-508650, 1 page (not prior art) Dated: 2025.
Brazil Search Report for corresponding BR 112024003818-1, dated Sep. 19, 2024, 4 pages (not prior art).

* cited by examiner

TIRE SEALANT CELL

BACKGROUND OF THE INVENTION

1. Field of the Invention

The present disclosure relates generally to methods and apparatus for applying a sealant layer to an inner surface of a tire. Such an apparatus may be referred to as a tire sealant cell.

2. Description of the Prior Art

A typical prior art tire sealant cell is described in WO2019123272A1 and WO2019123275A1.

There is a need for improved methods and apparatus for applying a sealant layer to an inner surface of a tire.

SUMMARY OF THE INVENTION

In one embodiment a method of applying a sealant layer to inner surfaces of tires may comprise steps of:
 (a) providing a tire sealant cell including:
  first and second sealant application stands arranged adjacent each other such that when tires are received on the first and second sealant application stands with rotational axes of the tires oriented generally horizontally, the tires are aligned end to end with tread areas of the tires facing each other;
  a tire handling robot located on one side of the first and second sealant application stands; and
  a dispense robot located on an opposite side of the first and second sealant application stands from the tire handling robot;
 (b) picking up a first tire with the tire handling robot and placing the first tire on the first sealant application stand;
 (c) applying a sealant bead to an inner surface of the first tire with a dispense tool carried by the dispense robot as the first tire is rotated by the first sealant application stand to form a sealant layer on the inner surface of the first tire;
 (d) picking up a second tire with the tire handling robot and placing the second tire on the second sealant application stand; and
 (e) applying a sealant bead to an inner surface of the second tire with the dispense tool carried by the dispense robot as the second tire is rotated by the second sealant application stand to form a sealant layer on the inner surface of the second tire.

Numerous objects, features and advantages of the present invention will be readily apparent to those skilled in the art upon reading of the following disclosure when taken in conjunction with the accompanying drawings.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

The Overall Process

Figure 1:
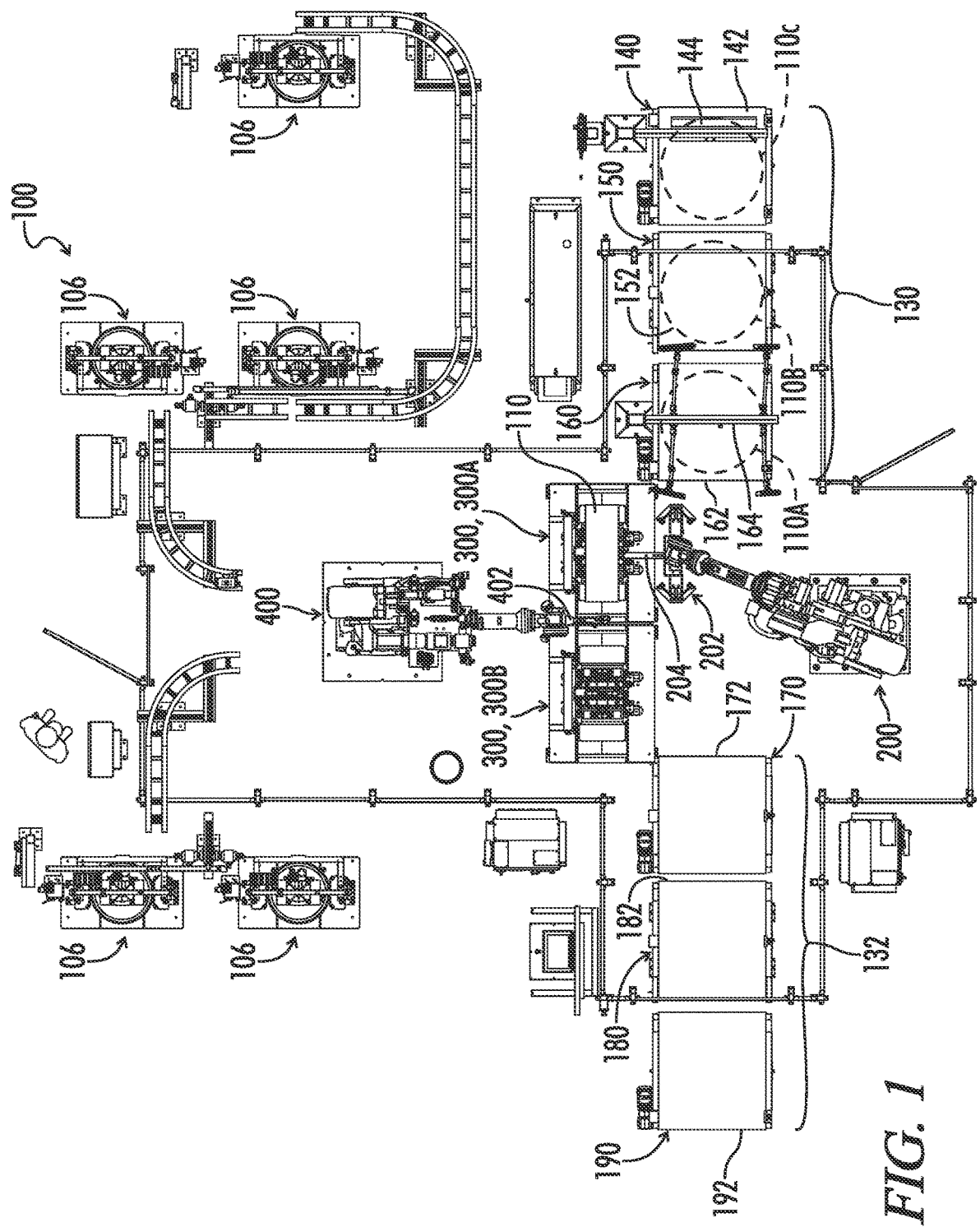
FIG. 1 is a plan view of the tire sealant cell system in accordance with the present disclosure.
Figure 2:
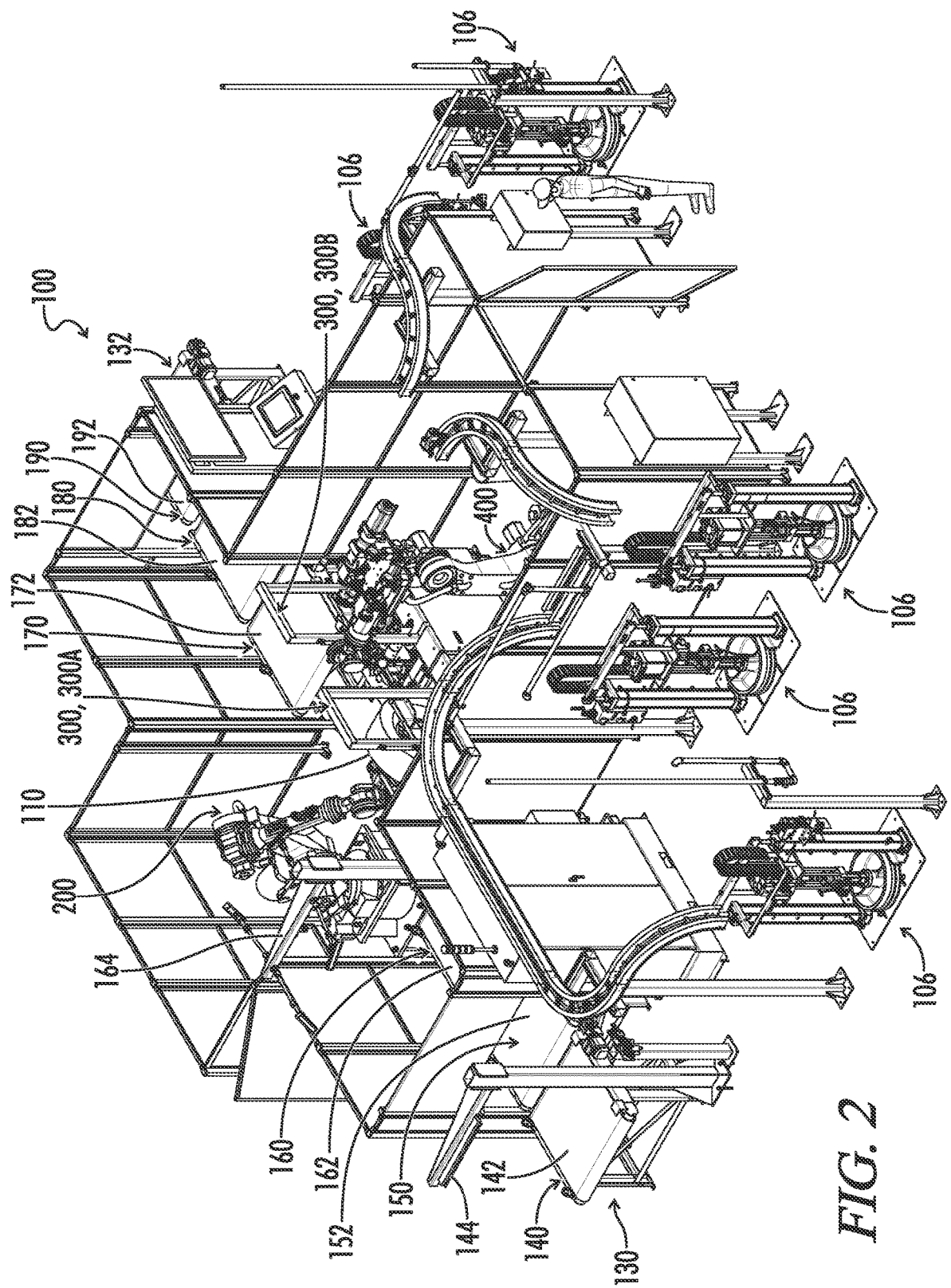
FIG. 2 is a left front perspective view of the tire sealant cell system of FIG. 1.

FIG. 1 schematically illustrates a top plan view of a tire sealant cell system 100 and FIG. 2 schematically illustrates a perspective view of the tire sealant cell system 100. The tire sealant cell system 100 may also be referred to herein as a tire sealant cell 100. The tire sealant cell system 100 is configured to automatically apply a sealant layer 102 to an inner surface portion 112 of a tire 110. The sealant layer 102 may be configured to automatically seal a hole (not shown) in the tire 110 which may be caused by road debris, such as, for example a nail or the like (not shown). As such, the sealant layer 102 is neither a solid nor a liquid, but remains in a semi-viscous state such that the sealant layer 102 can bind to the road debris, which has penetrated the tire 110, and to itself upon removal of said road debris such that no air can escape a cavity 114 of the tire 110. The inner surface portion 112 of the tire 110 may also be referred to herein as an inner surface 112 of the tire 110. The cavity 114 of the tire 110 may also be referred to herein as an interior 114 of the tire 110. The inner surface portion 112 of the tire 110 may be defined opposite the tread portion 116 of the tire 110 and may extend at least partially up the sidewalls 118a and 118b of the tire 110. The tread portion 116 of the tire 110 may also be referred to herein as an outside tread surface 116 of the tire 110. The tire sealant cell system 100 may provide higher output with better ratios than existing systems.

The sealant layer 102 may, for example, be comprised of DOW® sealant. In certain embodiments, the sealant layer 102 may be a 10:1 by weight DOW® sealant comprising a Part A component (not shown) and a Part B component (not shown) which may be stored separately and mixed together upon application. In other embodiments, the ratio may be adjusted. The initial cure time of the sealant layer 102 may be one-day, with a full cure in 28-days. The tire 110 can be moved before the one-day mark as long as care is taken not to significantly deform the tire 110. As such, handling the tire 110 via the tread portion 116 may be useful, as further disclosed below.

Tires (e.g., a first tire 110A, a second tire 110B, a third tire 110C, etc.) first interact with the tire sealant cell system 100 by being sequentially received by a supply conveyor 130 of the tire sealant cell system 100. The tires exit the tire sealant cell system 100 via a discharge conveyor 132 of the tire sealant cell system 100.

Figure 3:
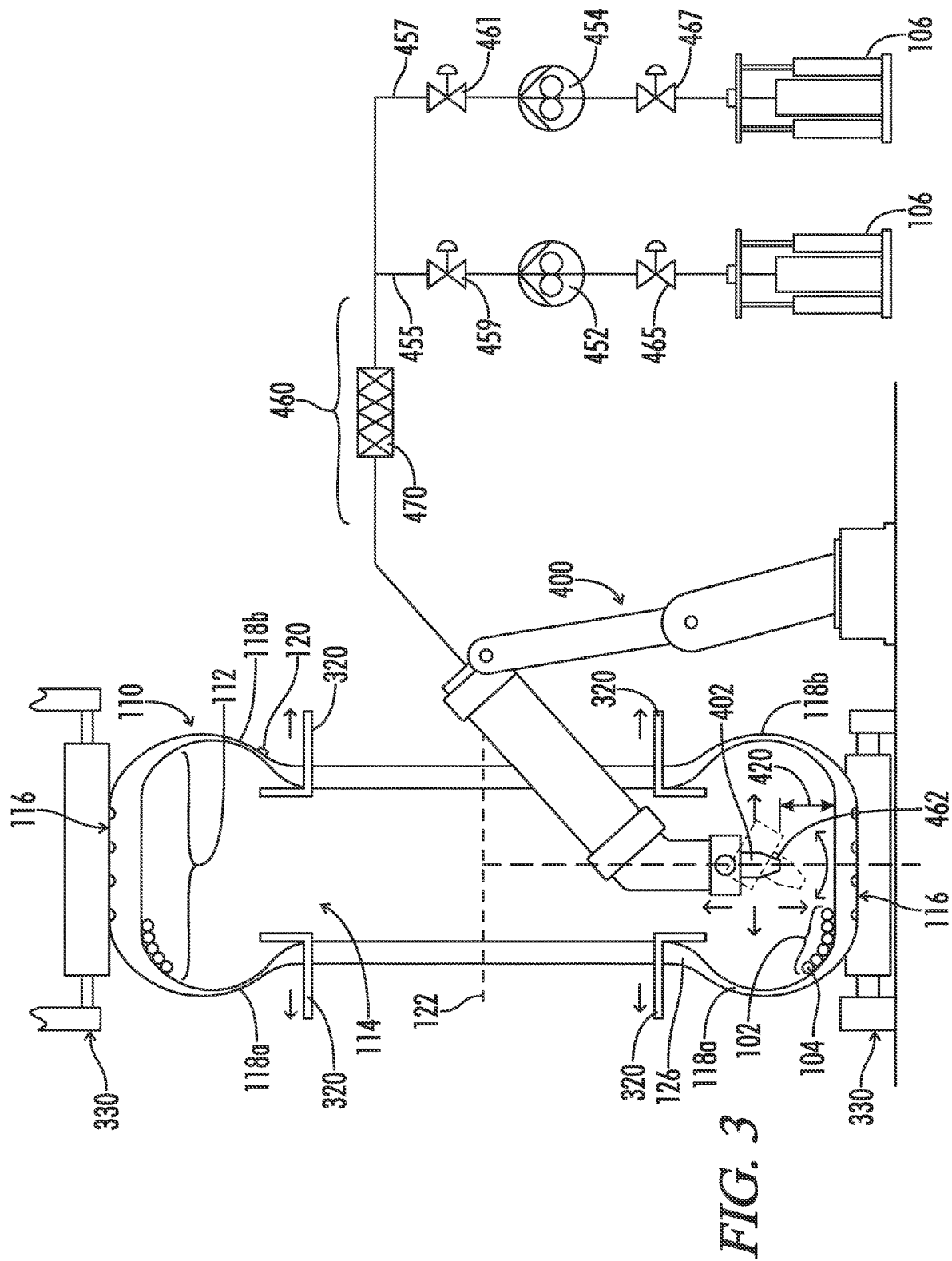
FIG. 3 is a schematic cross-section view of a tire located on one of the application stands with the dispense robot holding the dispense tool within the cavity of the tire to apply a sealant bead.

The supply conveyor 130 may include a tire identification station 140. The tire identification station 140 may include a first conveyor belt 142 for moving the tire 110 along the supply conveyor 130. The tire identification station 140 may further include a bar code reader (BCR) 144 which is configured to scan a tire code 120 (see FIG. 7) of the tire 110. The tire code 120 may also be referred to herein as a bar code 120. The bar code reader 144 may also be referred to herein as a scanner 144. The bar code reader 144 may, for example, be a Datalogic BCR array or the like. The tire code 120 may be specific to the tire 110 and may be inscribed or defined on an outer surface of the tire 110, as shown in FIG. 3. The tire code 120 may further be associated with specific information about the tire 110, such as, the tire's width, tread depth, sidewall height, opening diameter, or the like.

The supply conveyor 130 may further include first weigh station 150. The first weigh station 150 may include a second conveyor belt 152 for moving the tire 110 along the supply conveyor 130. The first weigh station 150 is configured to weigh and record a weight of the tire 110 prior to application of the sealant layer 102 within the tire 110.

The supply conveyor 130 may further include a tire position station 160. The tire position station 160 may include third conveyor belt 162 for moving the tire 110 along the supply conveyor 130. The tire position station 160 may further include a scanner 164 configured to locate a center 122 of the tire 110. The center 122 of the tire 110 may also be referred to herein as a rotational axis 122 of the tire 110, as shown in FIG. 3. In certain optional embodiments, the scanner 164 may be a Fanuc irVision camera, or the like, which may be paired with polarized blue lighting (not shown) to help identify the center 122 of the tire 110. In accordance with this embodiment, the third conveyor belt 162 may be colored blue in order to increase the effectiveness of the scanner 164 (e.g., the Fanuc ir Vision camera or the like).

The tire sealant cell system 100 may further comprise a tire handling robot 200, at least one application stand 300, and a dispense robot 400. The at least one application stand 300 may also be referred to herein as at least one sealant application stand 300. As illustrated, the at least one application stand 300 includes a first application stand 300A and a second application stand 300B. The first and second application stands 300A, 300B may be identical and will be further described with respect to the at least one application stand 300.

The first and second application stands 300A, 300B may be arranged adjacent to each other such that tires (e.g., a first tire 110A, a second tire 110B, a third tire 110C, etc.) may be received on the first and second application stands 300A, 300B with rotational axes 122 of the tires oriented generally horizontally. The tires received on the first and second application stands 300A, 300B may be aligned end-to-end with the tread portions 116 facing each other. The tire handling robot 200 may be positioned on one side of the first and second application stands 300A, 300B. The dispense robot 400 may be positioned on an opposite side of the first and second application stands 300A, 300B. Accordingly, one sidewall of the tire 110 faces the tire handling robot 200 and another sidewall of the tire 110 faces the dispense robot 400 when the tire 110 is received by one of the first or second application stands 300A, 300B.

The tire handling robot 200 may be configured to pick up the tire 110 off of the supply conveyor 130, or more specifically, the third conveyor belt 162 of the tire position station 160, using a tire gripping tool 202 of the tire handling robot 200 and place the tire 110 on one of the first or second application stands 300A, 300B, whichever is not occupied. The tire gripping tool 202 is configured to engage the tread portion 116 of the tire 110 when moving the tire 110. A gripping force of the tire gripping tool 202 may be adjusted based upon the tire code 120.

In certain embodiments, the tire handling robot 200 may further include a scanner 204. Once the tire handling robot 200 places the tire 110 on one of the at least one application stands 300, the tire gripping tool 202 disengages the tire 110 and a scanner 204, carried by the tire handling robot 200, may be used to scan (e.g., an initial scan or pre-scan) the inner surface portion 112 of the tire 110 while the tire 110 is rotated by the at least one application stand 300. In other embodiments, the dispense robot 400 may include a scanner for performing the initial scan. In still other embodiments, the scanner 204 for performing the initial scan may be supported by a separate robot, separate from either the tire handling robot 200 or the dispense robot 400.

Figure 4:
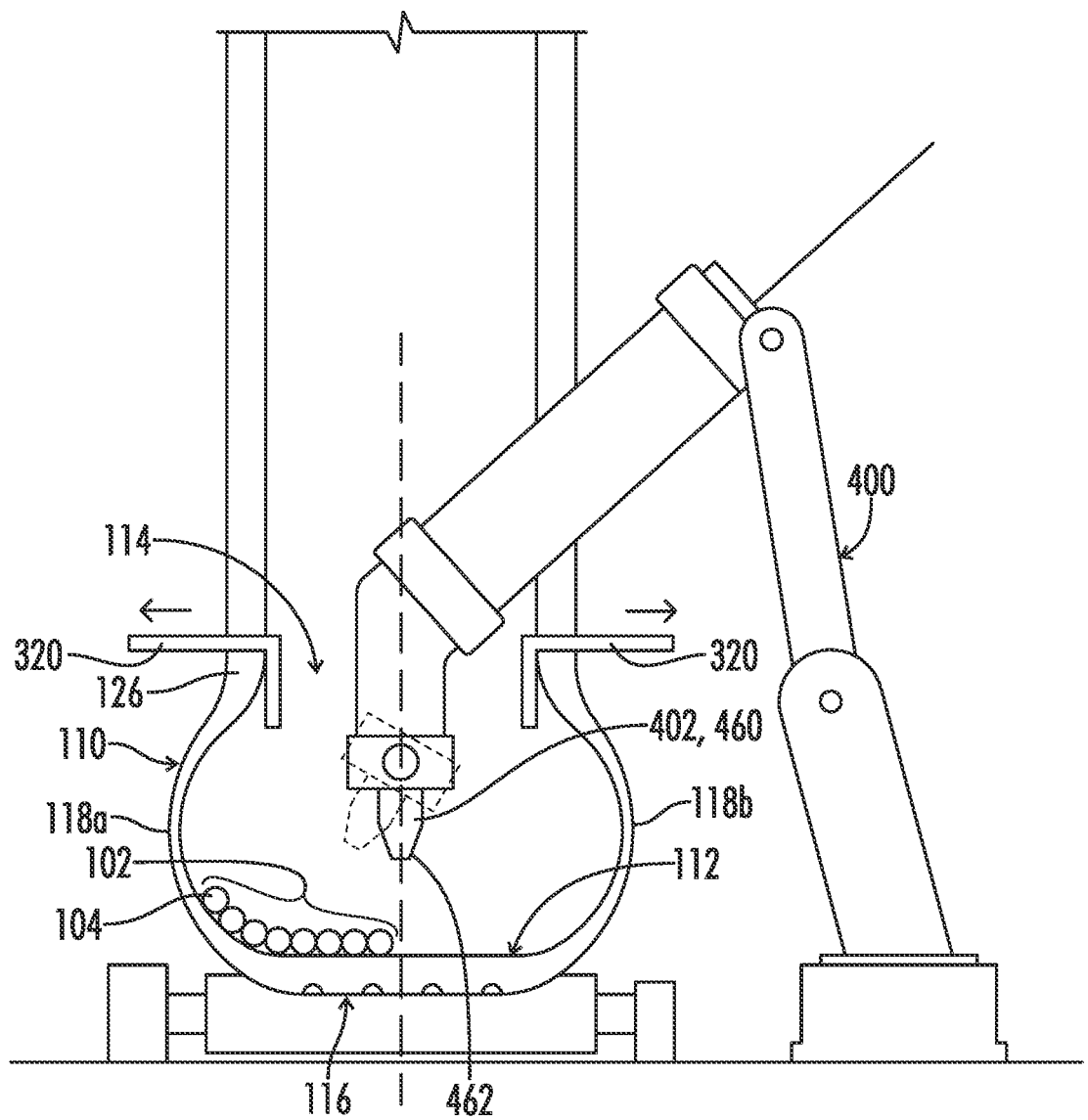
FIG. 4 is an enlarged schematic cross-section of the tire showing the sealant bead partially laid down to form the sealant layer on the inner surface of the tire.

The dispense robot 400 may be configured to apply a sealant bead 104 (as shown in FIGS. 3 and 4) using a dispense tool 402 of the dispense robot 400, to the inner surface portion 112 of the tire 110 while the tire 110 is rotated by one of the at least one application stands 300. The sealant bead 104 may be dispensed by the dispense tool 402 in a continuous ribbon on the inner surface portion 112 of the tire 110 as the tire 110 is rotated by one of the at least one application stands 300 to form the sealant layer 102. The sealant bead 104 is preferably generally rectangular in shape. The width of sealant bead 104 may be in a range of from 6 mm to 18 mm, preferably from 6 mm to 10 mm. The thickness of the sealant bead may be in a range from 3 mm to 5 mm, preferably about 4 mm. In an embodiment the sealant bead may have a width of 8 mm and a thickness of 4 mm. In other embodiments, the width and thickness of the sealant bead 104 may differ.

The dispense robot 400 may utilize the initial scan of the inner surface portion 112 of the tire 110, as described above and performed by either the tire handling robot 200 or the dispense robot 400, to calculate a path of travel, for example, in x, y, z coordinates for dispensing the sealant bead 104.

The dispense robot 400 may include at least one sensor 410 positioned on the dispense tool 402 of the dispense robot 400. The at least one sensor 410 may be configured to detect a position of the dispense tool 402 relative to the inner surface portion 112 of the tire 110. The at least one sensor 410 may further be configured to detect a distance 420 between the dispense tool and the inner surface portion 112 of the tire 110. In certain embodiments, at least one sensor 410 may be utilized to perform the initial scan of the inner surface portion 112 of the tire 110 while the tire 110 is rotated by the at least one application stand 300.

Once the dispense robot 400 has completed depositing the sealant bead 104 on the inner surface portion 112 of the tire 110 to form the sealant layer 102, one of the tire handling robot 200 or the dispense robot 400 may be configured to scan (e.g., a final scan or post-scan) the sealant layer 102 to determine if a gauge (e.g., a thickness) of the sealant layer 102 or sealant bead 104 is within set criteria (e.g., a minimum allowable gauge of the sealant layer 102). For example, the gauge must be sufficient such that the sealing performance is not adversely affected. Accordingly, in certain embodiments, the scanner 204 of the tire handling robot 200 may be utilized to scan the sealant layer 102 on the inner surface portion 112 of the tire 110. In other embodiments, at least one sensor 410 may be utilized to scan the sealant layer 102 on the inner surface portion 112 of the tire 110.

Figure 17:
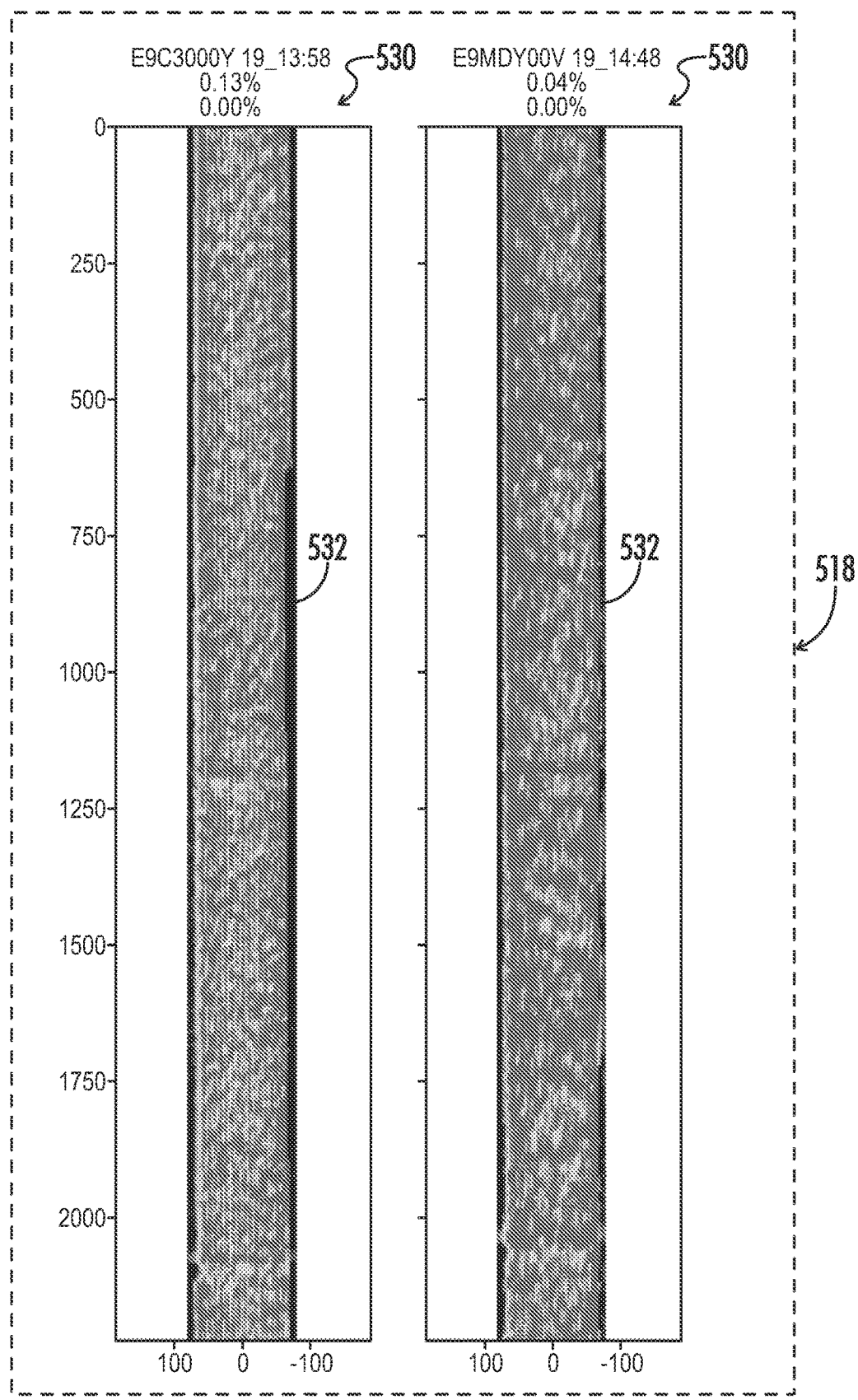
FIG. 17 is a visual representation of a scan of a gauge of the sealant layer on the inner surface of a tire.

The tire sealant cell system 100 may perform the final scan and may record data corresponding to the gauge of the sealant layer 102 on the inner surface portion 112 of the tire 110 in correlation with data corresponding to a location of the sealant layer 102 on the inner surface portion 112 of the tire 110. As shown in FIG. 17, the tire sealant cell system 100 may further include a display 518 which is configured to display a visual image 530 representative of the sealant layer 102 on the inner surface portion 112 of the tire 110. The visual image 530 may include visual indicia 532, generally color coded, corresponding to whether the gauge of the sealant layer is within the set criteria. The visual image 530 may show a flat version of the tire 110 broken out into, for example, 5 mm by 5 mm sections. Each section may include the visual indicia 532.

In certain optional embodiments, at least one sensor 410 may be utilized to scan, in real-time, the gauge of the sealant bead 104 as it is applied to the inner surface portion 112 of the tire 110 and transmit associated data to be displayed on the display 518.

Once the final scan is complete, the tire handling robot 200 may pick up the completed tire 110 off of the first or second application stands 300A, 300B and place the tire 110 on the discharge conveyor 132. More specifically, the tire handling robot 200 may place the tire 110 on a discharge receiving station 170 of the discharge conveyor 132. The discharge receiving station 170 may include a fourth conveyor belt 172 for moving the tire 110 along the discharge conveyor 132.

The discharge conveyor 132 may further include second weigh station 180. The second weigh station 180 may include a fifth conveyor belt 182 for moving the tire 110 along the discharge conveyor 132. The second weigh station 180 is configured to weigh the tire 110 after application of the sealant layer 102 within the tire 110. A change in weight of the tire 110 may be determined based on data from the first weigh station 150 and the second weight station 180. The change in weight may be recorded, stored, and aggregated, and may be used as a baseline data set associated with particular tires via the tire code 120.

The discharge conveyor 132 may further include a final station 190. The final station 190 may include a sixth conveyor belt 192 for moving the tire 110 along the discharge conveyor 132. The tire 110 may exit the tire sealant cell system 100 from the final station 190. In other embodiments, the tire 110 may exit the tire sealant cell system 100 from the second weigh station 180.

The tire sealant cell system 100 further includes a plurality of electronic flow (eFlow) drum pumps 106, each containing one of the two components used to create the sealant used for the sealant bead 104. Sealant for the sealant bead 104 is provided to the dispense robot 400 from at least two of the plurality of eFlow drum pumps 106 at a given time, each of the at least two eFlow drum pumps containing a different one of the two components used to create the sealant used for the sealant bead 104. The two components are mixed by the dispense robot 400 just prior to application of the sealant bead 104 to the inner surface portion 112 of the tire 110.

Tires (e.g., a first tire 110A, a second tire 110B, a third tire 110C, etc.) may continuously enter and exit the tire sealant cell system 100. For example, one tire may be on each of the six conveyor belts and the first and second application stands 300A, 300B at a given time. The dispense robot 400 may move back and forth between the first and second application stands 300A, 300B, applying the sealant bead 104 within a tire positioned on the given application stand before moving to the other. For example, the tire handling robot 200 may position a first tire 110A on the first application stand 300A and then the initial scan may be performed. While the dispense robot 400 applies the sealant bead 104 to the inner surface portion 112 of the first tire 110A, the tire handling robot 200 may proceed to position a second tire 110B on the second application stand 300B. Once the dispense robot 400 has completed applying the sealant bead 104 to the first tire 110A, the dispense robot 400 may move to the second application stand 300B and begin applying the sealant bead 104 to the inner surface portion 112 of the second tire 110B. Once the final scan of the first tire 110A has been performed, the tire handling robot 200 may proceed to remove the first tire 110A from the first application stand 300A and position the first tire 110A on the discharge conveyor 132. The tire handling robot 200 may then proceed to position a third tire 110C on the first application stand 300A. Once the dispense robot 400 has completed applying the sealant bead 104 to the second tire 110B, the dispense robot 400 may move back to the first application stand 300A and begin applying the sealant bead 104 to the inner surface portion 112 of the third tire 110C. Once the final scan of the second tire 110B has been performed, the tire handling robot 200 may proceed to remove the second tire 110B from the second application stand 300B and position the second tire 110B on the discharge conveyor 132. Application of the sealant layer 102 to tires may generally and successively proceed in this general manner. By including first and second application stands 300A, 300B, the efficiency or throughput of the tire sealant cell system 100 is increased.

The Tire Handling Robot

Figures 5, 6:
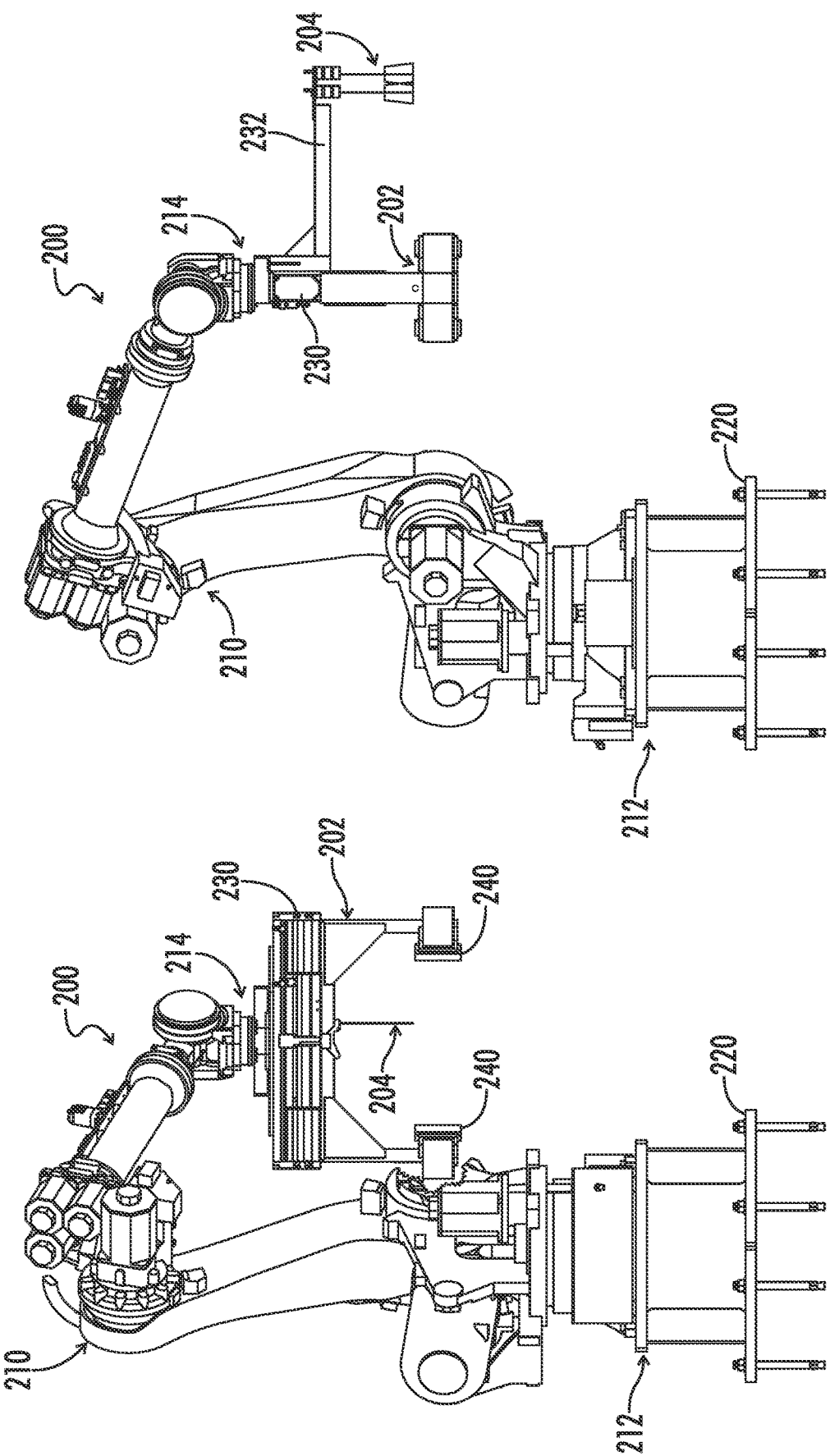
FIG. 5 is a front elevation view of the tire handling robot.
FIG. 6 is side elevation view of the tire handling robot.

FIG. 5 schematically illustrates a front elevation view of the tire handling robot 200 and FIG. 6 schematically illustrates a side elevation view of the tire handling robot 200.

The tire handling robot 200 may include an articulating arm assembly 210 having at least three axes of freedom. A proximal end 212 of the articulating arm assembly 210 may be coupled to a surface mounting plate 220 configured to be coupled to a support surface. The tire gripping tool 202 and the scanner 204 may be coupled to a distal end 214 of the articulating arm assembly 210. The proximal end 212 may also be referred to herein as a proximal arm member 212 and the distal end 214 may also be referred to herein as a distal arm member 214.

The tire handling robot 200 may further include a first arm portion 230 and a second arm portion 232 coupled to the distal end 214 of the articulating arm assembly 210. The first arm portion 230 may also be referred to herein as a first arm 230 and the second arm portion 232 may also be referred to herein as a second arm 232. The tire gripping tool 202 may be coupled to the first arm portion 230 and the scanner 204 may be coupled to the second arm portion 232. Accordingly, the first arm portion 230 may carry the tire gripping tool 202 and the second arm portion 232 may carry the scanner 204. In certain embodiments, at least one of the first arm portion 230 or the tire gripping tool 202 may consist of a pneumatic double ended cylinder.

The tire gripping tool 202 may include rubber bumpers 240 mounted on the ends of the tire gripping tool 202 to provide extra grip when engaging the tread portion 116 of the tire 110.

As previously mentioned, the tire handling robot 200 is configured to pick up the tire 110 off of the tire position station 160 using the tire gripping tool 202 such that the tire gripping tool 202 engages the tread portion 116 of the tire 110. A gripping force applied to the tread portion 116 of the tire 110 by the tire gripping tool 202 is adjusted based on the tire code 120, as scanned by the tire identification station 130. The tire handling robot 200 is then configured to place the tire 110 on one of the application stands 300A or 300B, which is available for receiving the tire 110, and disengage the tire gripping tool 202 from the tire 110. Once disengaged, the tire handling robot 200 may insert the scanner 204 into the cavity 114 of the tire 110 and perform the initial scan.

The Sealant Application Stands

Figure 9:
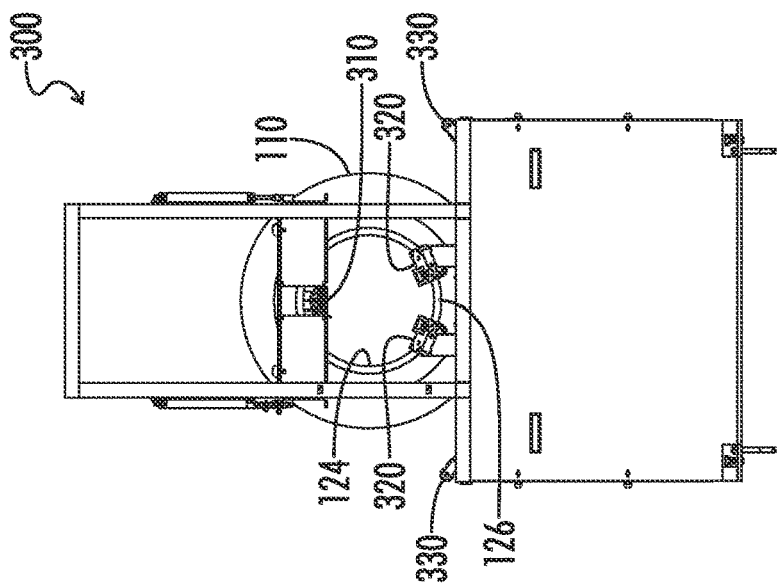
FIG. 9 is a rear elevation view of the application stand of FIG. 7.
Figure 8:
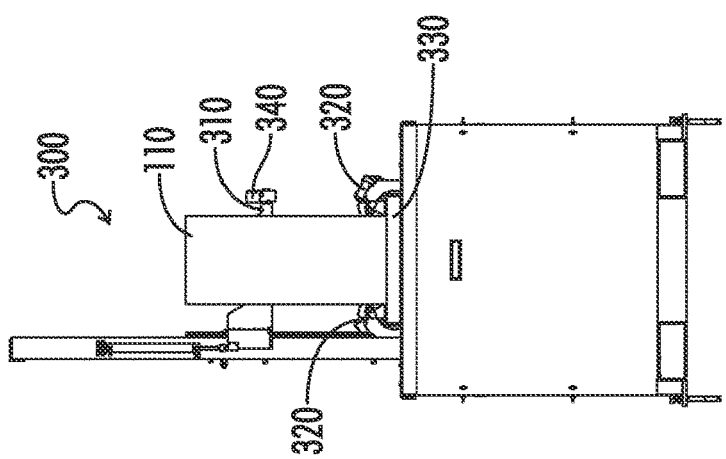
FIG. 8 is an end elevation view of the application stand of FIG. 7.
Figure 7:
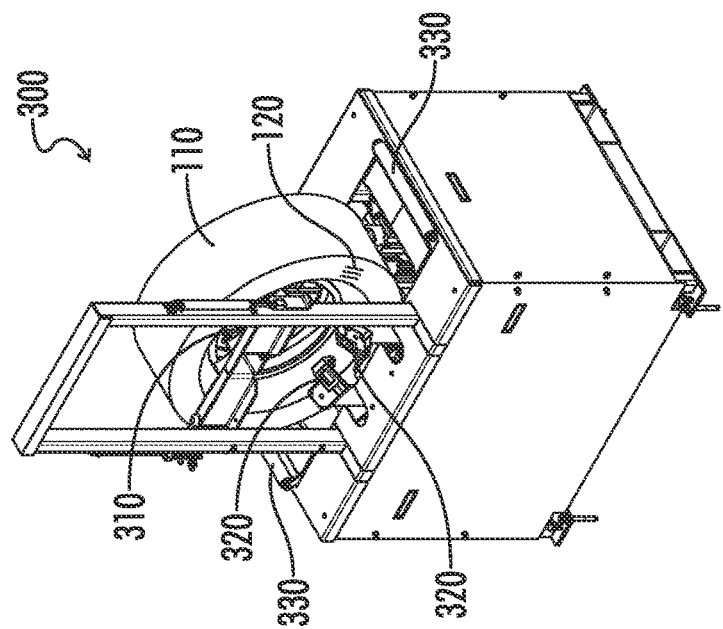
FIG. 7 is a perspective view of one application stand.

FIG. 7 schematically illustrates a perspective view of the at least one application stand 300, FIG. 8 schematically illustrates a side elevation view of the at least one application stand 300, and FIG. 9 schematically illustrates a rear elevation view of the at least one application stand 300. The first and second applications stands 300A, 300B may be identical and may further be described by describing the at least one application stand 300.

The at least one application stand 300 may include a top stabilization bar 310 and a plurality of drive rollers (not shown) positioned below the top stabilization bar 310. An upper portion of the inner diameter 124 of the tire 110 may be configured to rest on the top stabilization bar 310. A portion of the tread portion 116 of the tire 110 may be configured to rest on the plurality of drive rollers. The plurality of drive rollers may be configured to rotate the tire 110 about its rotational axis 122, for example, during scanning of the inner surface portion 112 of the tire 110 and application of the sealant bead 104 to the inner surface portion 112 of the tire 110.

The at least one application stand 300 may further include a plurality of bead spreader fingers 320 configured to spread a bead 126 of the tire 110 apart so that the dispense robot 400 may more easily access the inner surface portion 112 of the tire 110. The top stabilization bar 310 and the plurality of drive rollers may simultaneously acuate downward to allow the plurality of bead spreader fingers 320 to reach into the cavity 114 of the tire 110. Once the plurality of bead spreader fingers 320 are in position, the top stabilization bar 310 and the plurality of drive rollers may simultaneously acuate upward to cause the plurality of bead spreader fingers 320 to engage the bead 126 of the tire 110 such that the bead 126 is seated in the plurality of bead spreader fingers 320. Once seated, the plurality of bead spreader fingers 320 may be actuated to move away from the tire 110, thereby spreading the bead 126 of the tire 110 out to a set distance.

The at least one application stand 300 may further include a plurality of side stabilization arms 330 configured to pivot into engagement with the tread portion 116 of the tire 110. Each of the plurality of side stabilization arms 330 may include rollers configured to rotationally engage the tread portion 116 of the tire 110. The plurality of side stabilization arms 330 may be configured to engage the tread portion 116 of the tire 110 prior to rotation of the tire 110 by the plurality of drive rollers.

All moves of the at least one application stand 300 may be accomplished with servomotors except for the top stabilization bar 310 and the plurality of side stabilization arms 330. The top stabilization bar 310 and the plurality of side stabilization arms 330 may utilize air cylinders wherein the pressure is controlled using a proportional valve.

The at least one application stand 300 may further include a sensor 340 coupled to the top stabilization bar 310. The sensor 340 may be configured to sense a rotational position of the tire 110 by detecting a physical indicia on the rotating tire 110 passing a sensor 340. The physical indicia may, for example, be the tire code 120 defined on the tire 110. The sensor 340 may, for example, be a BANNER® QS30PDPQ sensor or the like sensor.

The Dispense Robot

Figure 11:
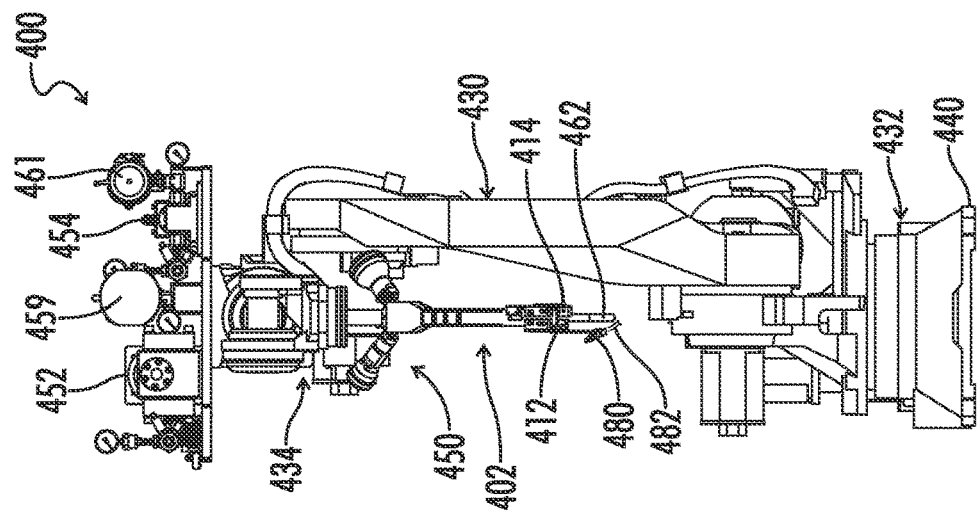
FIG. 11 is a front elevation view of the dispense robot.
Figure 10:
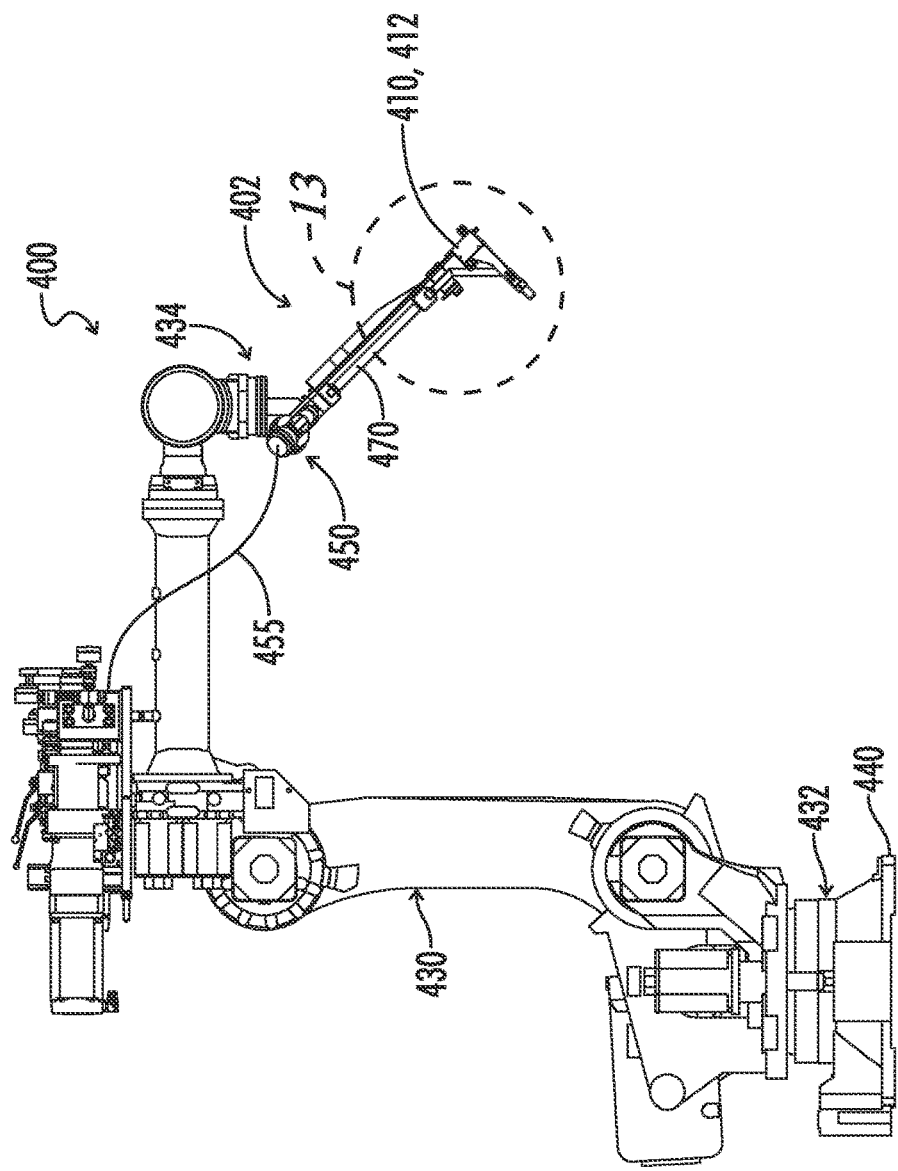
FIG. 10 is a side elevation view of the dispense robot.
Figure 14:
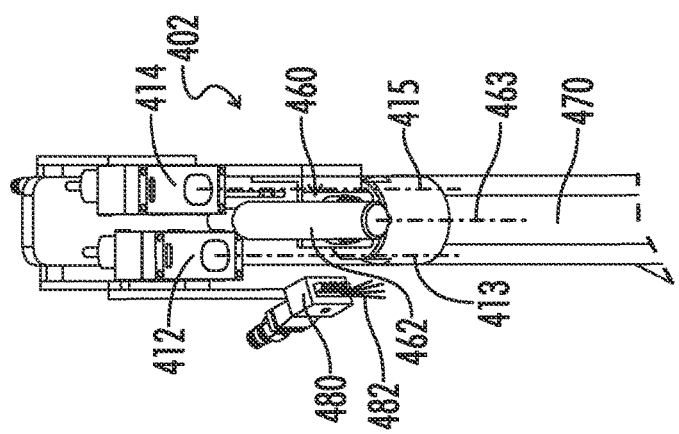
FIG. 14 is a front elevation view of the dispense tool carried by the dispense robot.
Figure 13:
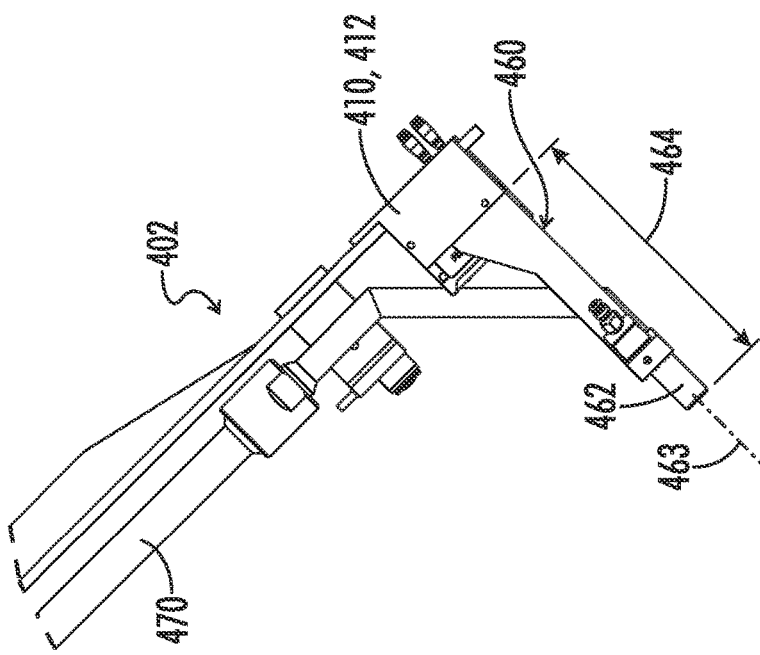
FIG. 13 is an enlarged side elevation view of the dispense tool carried by the dispense robot.
Figure 12:
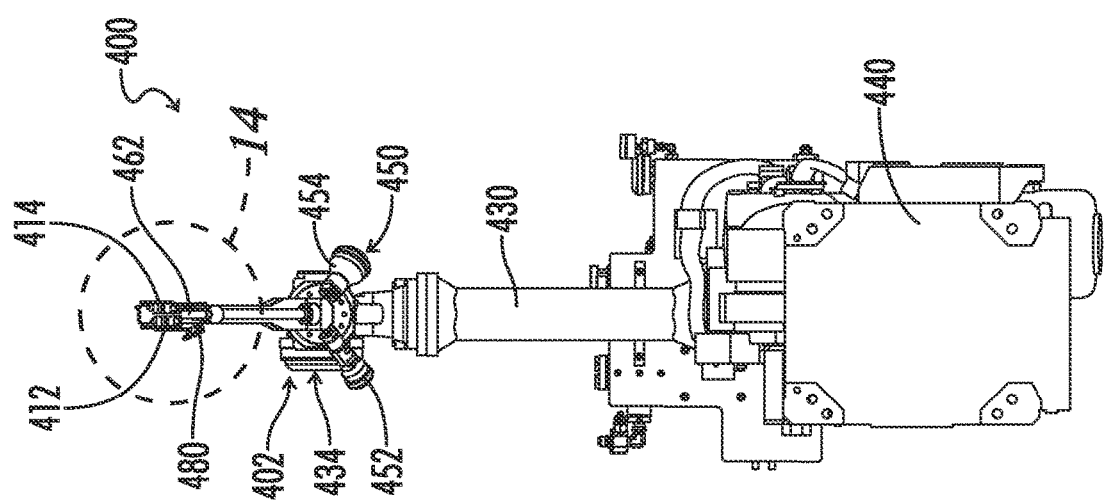
FIG. 12 is a top plan view of the dispense robot.
Figure 15:
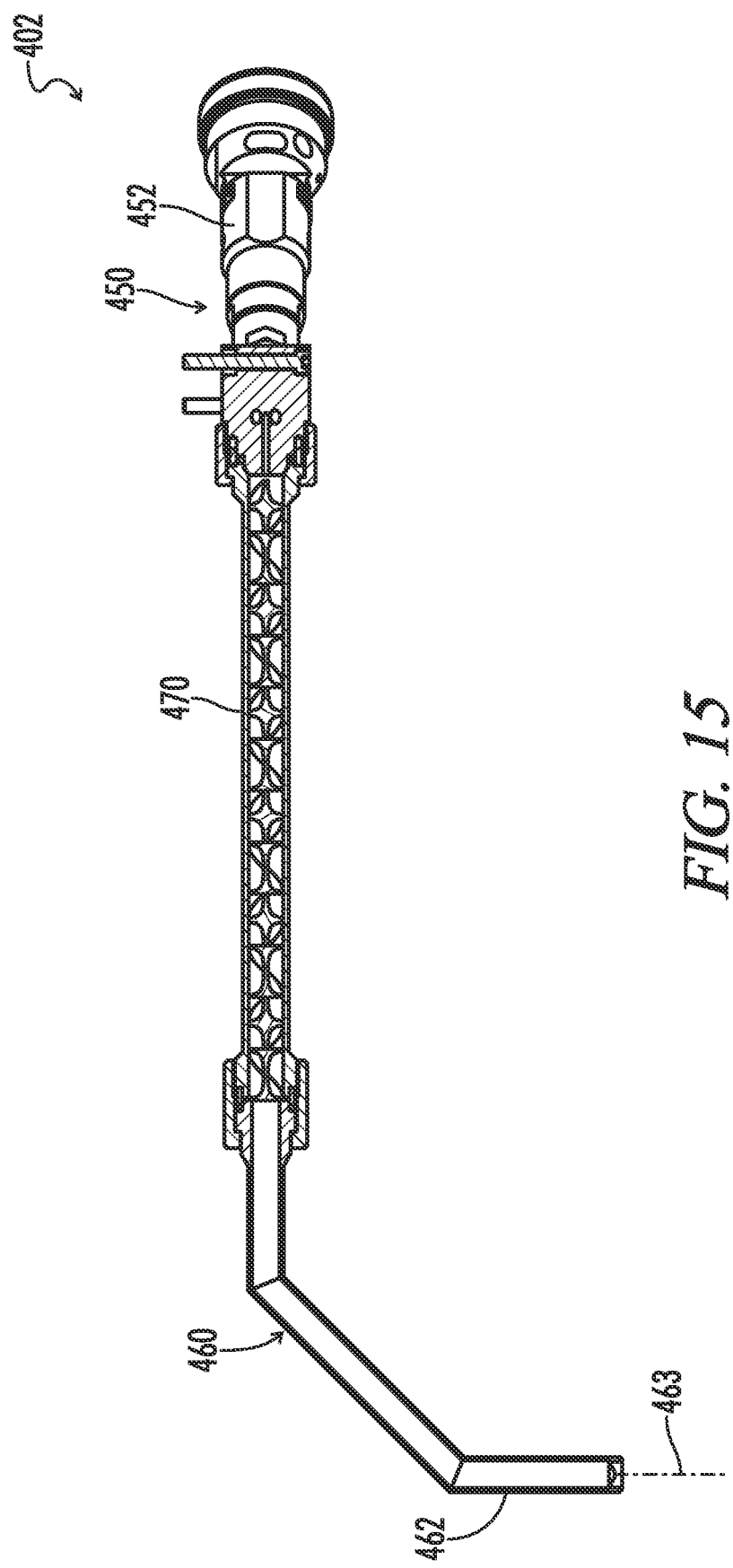
FIG. 15 is a cross-sectional view of the dispense tool carried by the dispense robot.

FIG. 10 schematically illustrates a side elevation view of the dispense robot 400, FIG. 11 schematically illustrates a front elevation view of the dispense robot 400, and FIG. 12 schematically illustrates a bottom plan view of the dispense robot 400. FIG. 13 schematically illustrates a side elevation view of the dispense tool 402 of the dispense robot 400 from FIG. 10. FIG. 14 schematically illustrates a bottom plan view of the dispense tool 402 of the dispense robot 400 from FIG. 12. FIG. 15 schematically illustrates a cross-sectional view of the dispense tool 402 of the dispense robot 400.

The dispense robot 400 may include an articulating arm assembly 430 having at least three axes of freedom. A proximal end 432 of the articulating arm assembly 430 may be coupled to a surface mounting plate 440 configured to be coupled to a support surface. The dispense tool 402 may be coupled to a distal end 434 of the articulating arm assembly 430. Accordingly, the dispense tool 402 is configured to be carried by the distal end 434 of the articulating arm assembly 430 of the dispense robot 400. The proximal end 432 may also be referred to herein as a proximal arm member 432 and the distal end 434 may also be referred to herein as a distal arm member 434.

The dispense robot 400 may further include a mixing valve 450 positioned on one of the articulating arm assembly 430 or the dispense tool 402. The mixing valve 450 may be configured to be coupled to two of the plurality of eFlow drum pumps 106 via a first sealant component metering dispenser 452 and a second sealant component metering dispenser 454. The first and second sealant component metering dispensers 452, 454 may be gear meters such as an NORDSON® servo driven gear meter. In other optional embodiments, the first and second sealant component metering dispensers 452, 454 may be a GRACO® HFR pump (e.g., featuring a hydraulic reciprocating pistol). As is best seen in FIGS. 10 and 11, the first and second sealant component metering dispensers 452, 454 may be mounted on the articulating arm assembly 210. First and second flexible conduits 455 and 457, as schematically seen in FIG. 3, may connect the first and second sealant component metering dispensers 452, 454, respectively, to the sealant nozzle 460.

A first shut off valve 459 may be disposed between the first sealant component metering dispenser 452 and the sealant nozzle 460 for shutting off flow of the first sealant component. A second shut off valve 461 may be disposed between the second sealant component metering dispenser 454 and the sealant nozzle 460 for shutting off flow of the second sealant component. The shut off valves 459 and 461 are preferably snuff back valves. The working principal of a snuff back valve is that on shutting off the valve a negative pressure is created to pull back the sealant material so as to achieve a quick cut off and/or prevent dripping of the sealant material.

A first on/off valve 465 may be located upstream of the first sealant component metering dispenser 452. A second on/off valve 467 may be located upstream of the second sealant component metering dispenser 454. The on/off valves may be pancake type valves.

The dispense tool 402 may include a sealant nozzle 460. The sealant nozzle 460 may include a nozzle tip 462 configured to dispense the sealant bead 104. The at least one sensor 410 may be positioned on the dispense tool 402 and may be configured to sense a position of the nozzle tip 462 relative to the inner surface portion 112 of the tire 110.

The at least one sensor 410 of the dispense robot 400 may include a first sensor 412 and a second sensor 414 located on opposite sides of the sealant nozzle 460. The first sensor 412 may also be referred to herein as a first distance sensor 412 and the second sensor 414 may also be referred to herein as a second distance sensor 414. The first and second sensors 412, 414 may be configured to view along a length 464 of the sealant nozzle 460 (shown in FIG. 13) such that the distance 420 of the nozzle tip 462 from the inner surface portion 112 of the tire 110 may be detected by at least one of the first sensor 412 or the second sensor 414. The first and second sensors 412, 414 may, for example, be LJV KEYENCE® profilometers.

In an embodiment as seen in FIG. 14 one of the first and second sensors 412, 414 may be located upstream of the sealant nozzle 460 with reference to a rotational direction of the tire 110 relative to the sealant nozzle 460, and the other of the first and second sensors may be located downstream of the sealant nozzle with reference to the rotational direction of the tire 110. In FIG. 14, assuming the tire rotational direction is from left to right, the first sensor 412 is the upstream sensor and the second sensor 414 is the downstream sensor.

The nozzle tip 462 has a tip axis 463 defining a direction in which the bead of sealant 104 is dispensed from the nozzle tip 462. Each of the first and second distance sensors 412 and 414 has a sensing axis 413 and 415, respectively, arranged parallel to the dispensing axis 463 of the nozzle tip 462.

One of the first and second distance sensors, in the illustrated embodiment the first distance sensor 412, is arranged beside the sealant nozzle 460 such that as the nozzle tip 462 traverses the width of the inner surface 112 of tire 110 in the traversing direction, the dispensing axis 463 of the nozzle tip 462 and the sensing axis 413 of the first distance sensor 412 intersect the inner surface 112 along a common circumferential line of the inner surface 112. The other of the first and second distance sensors, in the illustrated embodiment the second distance sensor 414, is arranged rearward (for example in a range of 11 to 16 mm rearward) relative to the sealant nozzle 460 with reference to the traversing direction such that as the nozzle tip 462 traverses the width of the inner surface 112 in the traversing direction the nozzle tip 462 leads the second distance sensor 414. For example, as seen in the schematic view of FIG. 4 the nozzle tip 462 is shown as moving in a traversing direction from left to right in the figure to lay down the sealant bead 104.

The first and second sensors 412 and 414, in combination with the controller 500 further discussed below, allow the nozzle tip 462 to be oriented perpendicular to the inner surface 112 of tire 110. The controller is configured to receive distance signals from the first and second distance sensors 412 and 414 and based upon a geometry of the inner surface 112 of the tire 110 to orient the sealant nozzle 460 so that the dispensing axis 463 is maintained perpendicular to the inner surface 112 of the tire 110 as the nozzle tip 462 traverses the width of the inner surface 112 in the traversing direction.

As previously mentioned, in certain optional embodiments at least one of the first sensor 412 or the second sensor 414 may be utilized to scan, in real-time, the gauge of the sealant bead 104 as it is applied to the inner surface portion 112 of the tire 110 and transmit associated data to be displayed on the display 518. For example, one of the first sensor 412 or the second sensor 414 may be configured to scan the inner surface portion 112 of the tire 110 while the other sensor scans the sealant bead 104 just after application thereof to the inner surface portion 112 of the tire 110.

The sealant nozzle 460 may further include a static mixer 470 positioned between the nozzle tip 462 and the first and second sealant component metering dispensers 452, 454. The static mixer 470 may also be referred to herein as an internal static mixer 470. As illustrated in FIG. 15, the static mixer 470 may include a plurality of irregular internal passages so as to create a thorough mixing of the two sealant components before exiting the sealant nozzle tip 462. The static mixer 470 may have a length in a range of 12 to 18 inches, preferably about 16 inches.

The first and second sealant component metering dispensers 452, 454 may be coupled directly to the static mixer 470. In certain alternate embodiments, the first and second sealant component metering dispensers 452, 454 may be coupled to the static mixer 470 using first and second flexible conduits 455 and 457.

The dispense tool 402 may further include an air nozzle 480 positioned adjacent to the nozzle tip 462. configured to eject an air stream 482 (shown in FIG. 14) directed against the sealant bead 104 to aid in tacking the bead of sealant material to the inner surface portion 112 of the tire 110. In certain embodiments, the air stream 482 may be planar.

In certain optional embodiments, the dispense robot 400 may include a camera 483 mounted on the dispense tool 402 such that an operator may be able to view the sealant bead 104 on the display 518 as it is dispensed.

The Controller

Figure 16:
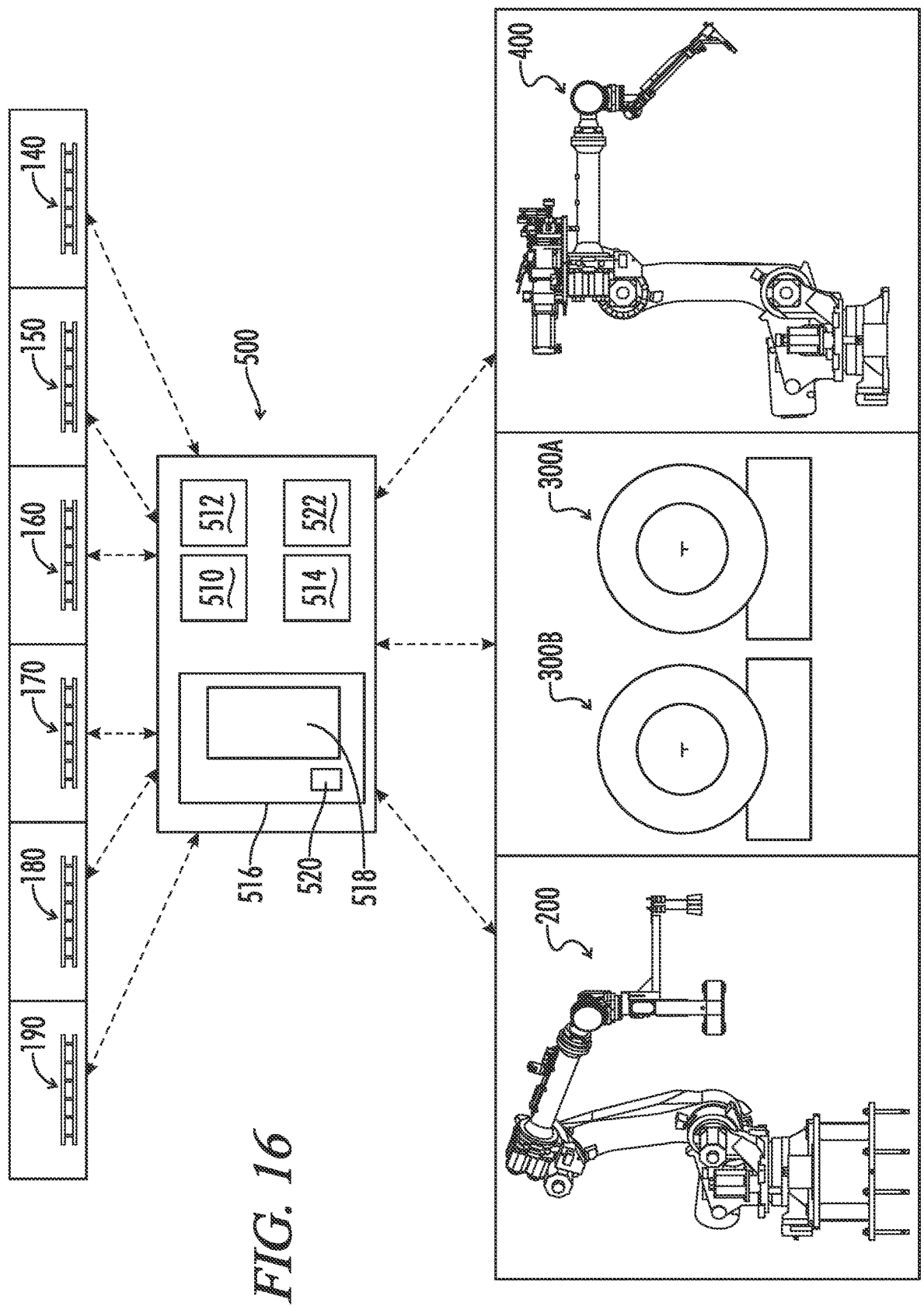
FIG. 16 is a schematic diagram of the controller and related components of the tire sealant cell system.

FIG. 16 schematically illustrates a controller 500 of the tire sealant cell system 100. The controller 500 may generate command signals for controlling the operation of the various components (e.g., the tire identification station 140, the first weigh station 150, the tire position station 160, the discharge receiving station 170, the second weigh station 180, the final station 190, the tire handling robot 200, the first and second application stations 300A, 300B, and the dispense robot 400) of the tire sealant cell system 100, which command signals are indicated schematically in FIG. 16 by phantom lines connecting the controller 500 to the aforementioned various components with the arrow indicating the flow of the command signal from the controller 500 to the respective components.

It will be understood that the data from the various aforementioned components, as disclosed herein, may be transmitted from the various aforementioned components to the controller 500, as also indicated schematically by the phantom lines and arrows.

For example, command signals from the controller 500 to each of the tire identification station 140, the first weigh station 150, the tire position station 160, the discharge receiving station 170, the second weigh station 180, the final station 190 may control movement of each of the first, second, third, fourth, fifth, and sixth conveyor belts 142, 152, 162, 172, 182, 192. Data from the tire identification station 140 to the controller 500 may include the tire code 120 as scanned by the bar code reader 144. Data from the first weigh station 150 to the controller 500 may include a weight of the tire 110 (e.g., a first tire 110A, a second tire 110B, a third tire 110C, etc.) prior to application of the sealant layer 102. Data from the tire position station 160 to the controller 500 may include a position of the tire 110 on the third conveyor belt 162, which may be utilized by the tire handling robot 200 for engaging the tire 110. Data from the second weigh station 180 to the controller 500 may include a weight of the tire 110 (e.g., a first tire 110A, a second tire 110B, a third tire 110C, etc.) after application of the sealant layer 102. The controller 500 may store the before and after weight of the tire 110 in association with the tire code 120 for use during future applications of the sealant layer 102 to tires having the same tire code 120.

Further for example, command signals from the controller 500 to the tire handling robot 200 may control movement of the articulating arm assembly 210, the tire gripping tool 202, and the scanner 204, as well as control functionalities of the scanner 204. Data from the tire handling robot 200 to the controller 500 may include a position of each of the articulating arm assembly 210, the tire gripping tool 202, and the scanner 204, as well as outputs from the scanner 204 associated with the tire 110, which may be utilized for plotting a path of travel in x, y, z coordinates of the dispense robot 400 for applying the sealant bead 104 to the tire 110.

Further for example, command signals from the controller 500 to each of the first and second application stations 300A, 300B may control movement of each of the plurality of drive rollers, the top stabilization bar 310, the plurality of bead spreader fingers 320, and the plurality of side stabilization arms 330 associated with each respective application station. Data from each of the first and second application stations 300A, 300B to the controller 500 may include a position of each of the plurality of drive rollers, the top stabilization bar 310, the plurality of bead spreader fingers 320, and the plurality of side stabilization arms 330 associated with each respective application station.

Finally, for example, command signals from the controller 500 to the dispense robot 400 may control movement of the articulating arm assembly 430 and the dispense tool 402, as well as control a release of the sealant bead 104 from the dispense tool 402 and a release of the air stream 482 from the air nozzle 480, as well as control functionalities of the at least one sensor 410. Data from the dispense robot 400 to the controller 500 may include a position of the articulating arm assembly 430 and the dispense tool 402, as well as outputs from the at least one sensor 410 associated with at least one of the tire 110, the sealant bead 104, or the sealant layer 102.

Controller 500 includes or may be associated with a processor 510, a computer readable medium 512, a data base 514 and an input/output module or control panel 516 having a display 518. An example of the display 518 is also shown in FIG. 17. An input/output device 520, such as a keyboard or other user interface, is provided so that the human operator may input instructions to the controller. It is understood that the controller 500 described herein may be a single controller having all of the described functionality, or it may include multiple controllers wherein the described functionality is distributed among the multiple controllers.

Various operations, steps or algorithms as described in connection with the controller 500 can be embodied directly in hardware, in a computer program product 522 such as a software module executed by the processor 500, or in a combination of the two. The computer program product 522 can reside in RAM memory, flash memory, ROM memory, EPROM memory, EEPROM memory, registers, hard disk, a removable disk, or any other form of computer-readable medium 512 known in the art. An exemplary computer-readable medium 512 can be coupled to the processor 500 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The Method of Applying a Sealant Layer to an Inner Surface of a Tire

A method of applying a sealant layer to an inner surface of a tire may comprise:
(a) picking up a first tire 110A with a tire handling robot 200 and placing the first tire 110A on a first application stand 300A with a rotational axis 122 of the first tire 110A oriented generally horizontally;
(b) scanning an inner surface 112 of the first tire 110A with a scanner 204 carried by the tire handling robot 200 as the first tire 110A is rotated by the first application stand 300A;
(c) applying a sealant bead 104 to the inner surface 112 of the first tire 110A with a dispense tool 402 carried by a dispense robot 400 as the first tire 110A is rotated by the first application stand 300A to form a sealant layer 102 on the inner surface 112 of the first tire 110A; and
(d) scanning the sealant layer 102 of the first tire 110A with the scanner 204 carried by the tire handling robot 200 as the first tire 110A is rotated by the first application stand 300A.

The tire handling robot 200 of the method may include a first arm portion 230 carrying a tire gripping tool 202 and a second arm portion 232 carrying the scanner 204. In accordance with the method, after placing the first tire 110A on the first application stand 300A, the tire handling robot 200 may release the first tire 110A from the tire gripping tool 202, and then the tire handling robot 200 may insert the scanner 204 into a cavity 114 of the first tire 110A.

In step (a) the tire gripping tool 202 may grip a tread portion 116 of the first tire 110A.

The method may further comprise, after step (d), picking up the first tire 110A from the first application stand 300A with the tire handling robot 200 and placing the first tire 110A on a discharge conveyor 132.

The method may further comprise, prior to step (a), weighing the first tire 110A on a first weigh station 150 of a supply conveyor 130; and weighing the first tire 110A again on a second weigh station 180 of the discharge conveyor 132 and determining a change in weight of the first tire 110A.

The method may further comprise picking up a second tire 110B with the tire handling robot 200 and placing the second tire 110B on a second application stand 300B with a rotational axis 122 of the second tire 110B oriented generally horizontally; scanning an inner surface portion 112 of the second tire 110B with the scanner 204 carried by the tire handling robot 200 as the second tire 110B is rotated by the second application stand 300B; applying a sealant bead 104 to the inner surface portion 112 of the second tire 110B with the dispense tool 402 carried by the dispense robot 400 as the second tire 110B is rotated by the second application stand 300B to form a sealant layer 102 on the inner surface portion 112 of the second tire 110B; and scanning the sealant layer 102 of the second tire 110B with the scanner 204 carried by the tire handling robot 200 as the second tire 110B is rotated by the second application stand 300B.

The first and second application stands 300A, 300B may be arranged adjacent each other such that the tread portion 116 of the first tire 110A on the first application stand 300A faces the tread portion 116 of the second tire 110B on the second application stand 300B, with one side wall of each tire facing toward the tire handling robot 200 and with another side wall of each tire facing toward the dispense robot 400. The tire handling robot 200 may perform the scanning steps from one side of the first and second tires 110A, 110B. The dispense robot 400 may perform the applying steps from an opposite side of the first and second tires 110A, 110B.

The method may further comprise, prior to step (a), scanning with a bar code reader 144 the first tire 110A and identifying a tire code 120. The tire gripping tool 202 may grip a tread portion 116 of the first tire 110A and a gripping force is adjusted based upon the tire code 120.

The method may further comprise, during step (c), sensing a gauge of the sealant bead 104 as the sealant bead 104 is laid down on the inner surface portion 112 of the first tire 110A and recording data corresponding to the gauge of the sealant bead 104 in correlation with data corresponding to a location of the sealant bead 104 on the inner surface portion 112 of the first tire 110A.

The method may further comprise displaying on a display 518 a visual image 530 representative of the sealant bead 104 on the inner surface portion 112 of the first tire 110A. The visual image 530 (shown in FIG. 17) may include visual indicia 532 corresponding to whether the gauge of the sealant bead 104 is within the set criteria.

A Further Method of Applying a Sealant Layer to Inner Surfaces of Tires

A further method of applying a sealant layer to inner surfaces of tires may comprise steps of:
(a) providing a tire sealant cell 100 including:
 first and second sealant application stands 300A, 300B arranged adjacent each other such that when tires 110A, 110B, 110C, are received on the first and second sealant application stands with rotational axes 122 of the tires oriented generally horizontally, the tires are aligned end to end with tread areas 116 of the tires facing each other;
 a tire handling robot 200 located on one side of the first and second sealant application stands; and
 a dispense robot 400 located on an opposite side of the first and second sealant application stands from the tire handling robot;
(b) picking up a first tire 110A with the tire handling robot 200 and placing the first tire 110A on the first sealant application stand 300A;
(c) applying a sealant bead 104 to an inner surface 112 of the first tire 110A with a dispense tool 402 carried by the dispense robot 400 as the first tire 110A is rotated by the first sealant application stand 300A to form a sealant layer 102 on the inner surface 112 of the first tire 110A;

(d) picking up a second tire 110B with the tire handling robot 200 and placing the second tire 110B on the second sealant application stand 300B;

(e) applying a sealant bead 104 to an inner surface 112 of the second tire 110B with the dispense tool 402 carried by the dispense robot 400 as the second tire 110B is rotated by the second sealant application stand 300B to form a sealant layer 102 on the inner surface 112 of the second tire 110B.

The method may further comprise, between steps (b) and (c), pre-scanning the inner surface portion 112 of the first tire 110A with a scanner 204 carried by the tire handling robot 200 as the first tire 110A is rotated by the first sealant application stand 300A.

The method may further comprise, during step (e): post-scanning the sealant layer 102 of the first tire 110A with the scanner 204 carried by the tire handling robot 200 as the first tire 110A is rotated by the first sealant application stand 300A; then removing the first tire 110A from the first sealant application stand 300A with the tire handling robot 200 and placing the first tire 110A on a discharge conveyor 132; then picking up a third tire 110C with the tire handling robot 200 and placing the third tire 110C on the first sealant application stand 300A; and then pre-scanning the inner surface portion 112 of the third tire 110C with the scanner 204 carried by the tire handling robot 200 as the third tire 110C is rotated by the first sealant application stand 300A.

The method may further comprise, after step (d) and before removing the second tire 110B from the second sealant application stand 300B: post-scanning the sealant layer 102 of the first tire 110A with the scanner 204 carried by the tire handling robot 200 as the first tire 110A is rotated by the first sealant application stand 300A; then removing the first tire 110A from the first sealant application stand 300A with the tire handling robot 200 and placing the first tire 110A on a discharge conveyor 132; then picking up a third tire 110C with the tire handling robot 200 and placing the third tire 110C on the first sealant application stand 300A; and then pre-scanning the inner surface portion 112 of the third tire 110C with the scanner 204 carried by the tire handling robot 200 as the third tire 110C is rotated by the first sealant application stand 300A.

The method may further comprise, before step (c), pre-scanning an inner surface portion 112 of the first tire 110A with a scanner 204 carried by the tire handling robot 200 as the first tire 110A is rotated by the first sealant application stand 300A; and, after step (c), post-scanning the sealant layer 102 of the first tire 110A with the scanner 204 carried by the tire handling robot 200 as the first tire 110A is rotated by the first sealant application stand 300A.

The tire handling robot 200 may include a first arm portion 230 carrying a tire gripping tool 202 and a second arm portion 232 carrying the scanner 204. After placing the first tire 110A on the first sealant application stand 300A, the tire handling robot 200 may release the first tire 110A from the tire gripping tool 202, and then the tire handling robot 200 may insert the scanner 204 into a cavity 114 of the first tire 110A.

The method may further comprise, prior to step (b) weighing the first tire 110A on a first weigh station 150 of a supply conveyor 130; after step (c) removing the first tire 110A from the first sealant application stand 300A with the tire handling robot 200 and placing the first tire 110A on a discharge conveyor 132; and weighing the first tire 110A again on a second weigh station 180 of the discharge conveyor 132 and determining a change in weight of the first tire 110A.

The method may further comprise, prior to step (b), scanning with a bar code reader 144 the first tire 110A and identifying a tire code 120. In step (b) a tire gripping tool 202 carried by the tire handling robot 200 may grip a tread portion 116 of the first tire 110A and a gripping force may be adjusted based upon the tire code 120.

The method may further comprise, during step (c), sensing a gauge of the sealant bead 104 as the sealant bead 104 is laid down on the inner surface portion 112 of the first tire 110A and recording data corresponding to the gauge of the sealant bead 104 in correlation with data corresponding to a location of the sealant bead 104 on the inner surface portion 112 of the first tire 110A.

The method may further comprise displaying on a display 518 a visual image 530 representative of the sealant bead 104 on the inner surface portion 112 of the first tire 110A. The visual image 530 may include visual indicia 532 corresponding to whether the gauge of the sealant bead 104 is within set criteria.

Figure 18:
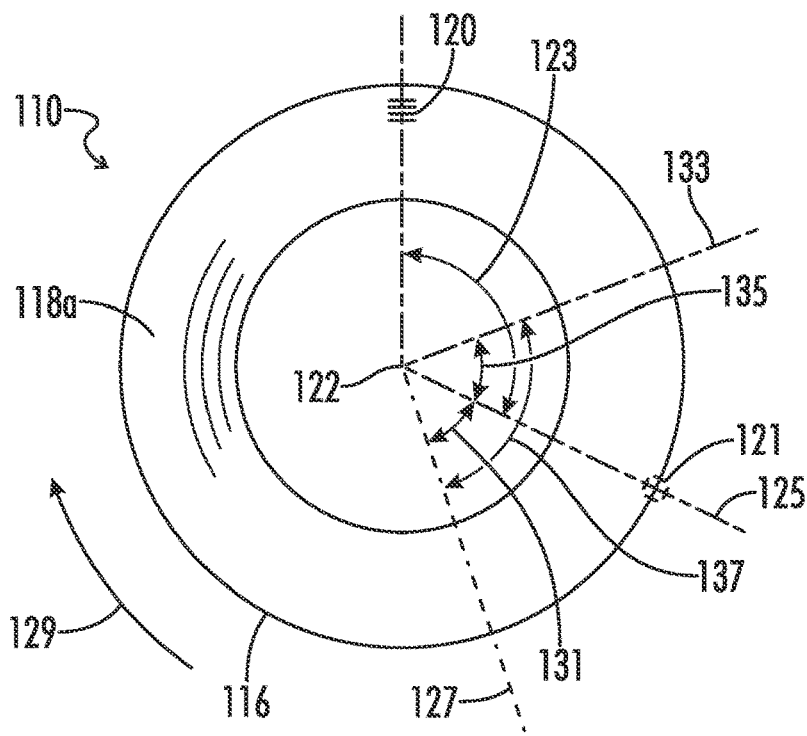
FIG. 18 is a schematic side elevation view of a tire having improved balance due to the sealant layer.

A Method of Applying a Sealant Layer to an Inner Surface of a Tire While Simultaneously Balancing the Tire The tire sealant cell system 100 may also be used to improve the balance of the tires 110 so that less additional balancing is required when the tire is mounted on a wheel. As schematically illustrated in FIG. 18 the tire 110 includes the indicia 120, which may be a bar code placed physically on the tire. This indicia 120 may be used as a reference point to identify circumferential locations on the tire. Any other physical feature on the tire could also be used as a reference point. Prior to the time the tire 110 is received on the supply conveyor 130 the tire may be tested for balance and a "light spot" of the tire may be identified with reference to the reference point such as indicia 120. For example, as schematically seen in FIG. 18 a light spot 121 may identified as being at an angle 123 from the indicia 120. This data is stored with reference to the individual tire and is associated with the indicia 120. Thus when the individual tire is received on the supply conveyor and the indicia 120 is scanned by scanner 164, the controller 500 will know the location of the light spot 121 of this individual tire. The location of the light spot 121 may be defined as the angular location 123, relative to indicia 120, of a radial line 125 through the light spot 121.

Then when the sealant bead 104 is laid down to form the sealant layer 102 it may be done in a manner to add more weight in the vicinity of the light spot 121 than on other portions of the tire. The resulting tire with the sealant layer will be better balanced than it was prior to the addition of the sealant layer 102.

Figure 19:
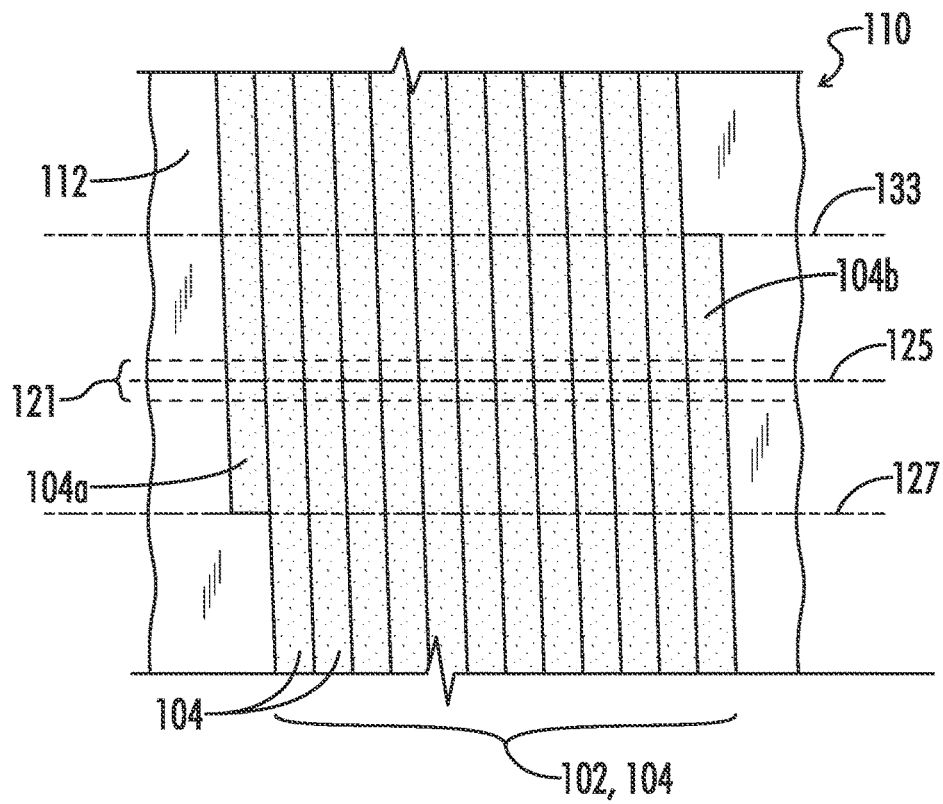
FIG. 19 is a laid-out view of a portion of the sealant layer of the tire of FIG. 18.

One way to accomplish this improved balance is to overlap a starting portion and an ending portion of the spiral wound sealant bead 104 on opposite circumferential sides of the light spot 121. This is schematically shown in FIGS. 18 and 19. The overlap may be achieved by starting the applying of the sealant bead 104 at a first circumferential location 127 ahead of the balance light spot 121 in a direction of rotation 129 by a first angle 131 about the rotational axis of the tire, and stopping the applying of the sealant bead 104 at a second circumferential location 133 behind the balance light spot by a second angle 135 substantially equal to the first angle 131.

The second angle 135 may be within a range of plus or minus 10 degrees of the first angle 131, and more preferably within a range of plus or minus 5 degrees of the first angle 131.

The first angle 131 may be within a range of from 30 to 60 degrees, more preferably within a range of from 40 to 50 degrees, and most preferably about 45 degrees.

The result of this process is a tire 110 including the tread portion 116 and the first and second sidewall portions 118a and 118b extending radially inward from the tread portion 116. The inner surface 112 defines the inner cavity 114 of the tire 110 between the first and second sidewall portions 118a and 118b. The spiral wound sealant bead 104 (see FIG. 19) is laid down on the inner surface 112 and includes a starting end portion 104a closest to the first sidewall 118a and a terminating portion 104b closest to the second sidewall 118b. The starting portion 104a and the terminating portion 104b overlap by an overlap angle 137 about the tire axis in a range of from 80 to 100 degrees.

The tire light spot 121 may be located within the overlap angle 137. The tire light spot 121 may be located within plus or minus ten degrees of a center of the overlap angle 137. The tire light spot 121 is preferably centered within the overlap angle 137.

Thus, it is seen that the apparatus and methods of the present invention readily achieve the ends and advantages mentioned as well as those inherent therein. While certain preferred embodiments of the present invention have been illustrated and described for purposes of the present disclosure, numerous changes in the arrangement and construction of parts and steps may be made by those skilled in the art which changes are encompassed within the scope and spirit of the present invention as defined by the appended claims.

What is claimed is:

1. A method of applying a sealant layer to inner surfaces of tires, the method comprising:
   (a) providing a tire sealant cell including:
      first and second sealant application stands arranged adjacent each other such that when tires are received on the first and second sealant application stands with rotational axes of the tires oriented generally horizontally, the tires are aligned end to end with tread areas of the tires facing each other;
      a tire handling robot located on one side of the first and second sealant application stands; and
      a dispense robot located on an opposite side of the first and second sealant application stands from the tire handling robot;
   (b) picking up a first tire with the tire handling robot and placing the first tire on the first sealant application stand;
   (c) applying a sealant bead to an inner surface of the first tire with a dispense tool carried by the dispense robot as the first tire is rotated by the first sealant application stand to form a sealant layer on the inner surface of the first tire;
   (d) picking up a second tire with the tire handling robot and placing the second tire on the second sealant application stand; and
   (e) applying a sealant bead to an inner surface of the second tire with the dispense tool carried by the dispense robot as the second tire is rotated by the second sealant application stand to form a sealant layer on the inner surface of the second tire.

2. The method of claim 1, further comprising:
between steps (b) and (c), pre-scanning the inner surface of the first tire with a scanner as the first tire is rotated by the first sealant application stand.

3. The method of claim 2, wherein:
the scanner is carried by the tire handling robot.

4. The method of claim 2, wherein:
the scanner is carried by a robot other than the tire handling robot.

5. The method of claim 2, further comprising:
during step (e):
   post-scanning the sealant layer of the first tire with the scanner as the first tire is rotated by the first sealant application stand;
then removing the first tire from the first sealant application stand with the tire handling robot and placing the first tire on a discharge conveyor;
   then picking up a third tire with the tire handling robot and placing the third tire on the first sealant application stand; and
   then pre-scanning an inner surface of the third tire with the scanner as the third tire is rotated by the first sealant application stand.

6. The method of claim 2, further comprising:
after step (d) and before removing the second tire from the second sealant application stand:
   post-scanning the sealant layer of the first tire with the scanner as the first tire is rotated by the first sealant application stand;
   then removing the first tire from the first sealant application stand with the tire handling robot and placing the first tire on a discharge conveyor;
   then picking up a third tire with the tire handling robot and placing the third tire on the first sealant application stand; and
   then pre-scanning an inner surface of the third tire with the scanner as the third tire is rotated by the first sealant application stand.

7. The method of claim 1, further comprising:
before step (c) pre-scanning an inner surface of the first tire with a scanner as the first tire is rotated by the first sealant application stand; and
after step (c) post-scanning the sealant layer of the first tire with the scanner as the first tire is rotated by the first sealant application stand.

8. The method of claim 7, wherein:
the tire handling robot includes a first arm carrying a tire gripping tool and a second arm carrying the scanner; and
after placing the first tire on the first sealant application stand the tire handling robot releases the first tire from the tire gripping tool, and then the tire handling robot inserts the scanner into a cavity of the first tire.

9. The method of claim 1, further comprising:
prior to step (b) weighing the first tire on a first weigh station of a supply conveyor;
after step (c) removing the first tire from the first sealant application stand with the tire handling robot and placing the first tire on a discharge conveyor; and
weighing the first tire again on a second weigh station of the discharge conveyor and determining a change in weight of the first tire.

10. The method of claim 1, further comprising:
prior to step (b) scanning with a sensor the first tire and identifying a tire code;
wherein in step (b) a tire gripping tool carried by the tire handling robot grips an outside tread surface of the first tire and a gripping force is adjusted based upon the tire code.

11. The method of claim 1, further comprising:
before step (c), pre-scanning the inner surface of the first tire with a scanner as the first tire is rotated by the first sealant application stand and determining a pre-scan distance from the scanner to the inner surface at each of a plurality of areas of the inner surface;
after step (c), post-scanning the sealant layer of the first tire with the scanner as the first tire is rotated by the first sealant application stand and determining a post-scan distance from the scanner to the sealant layer at each of the plurality of areas of the inner surface; and
comparing the post-scan distance to the pre-scan distance to determine a thickness of the sealant layer at each of the plurality of areas of the inner surface.

12. The method of claim 11, further comprising:
displaying on a monitor a visual image representative of the sealant bead on the inner surface of the tire, the visual image including visual indicia corresponding to the thickness of the sealant layer at each of the plurality of layers of the inner surface.

* * * * *